S. C. HILL.
MOLD.
APPLICATION FILED MAR. 7, 1914.
1,183,067.
Patented May 16, 1916.
7 SHEETS—SHEET 5.
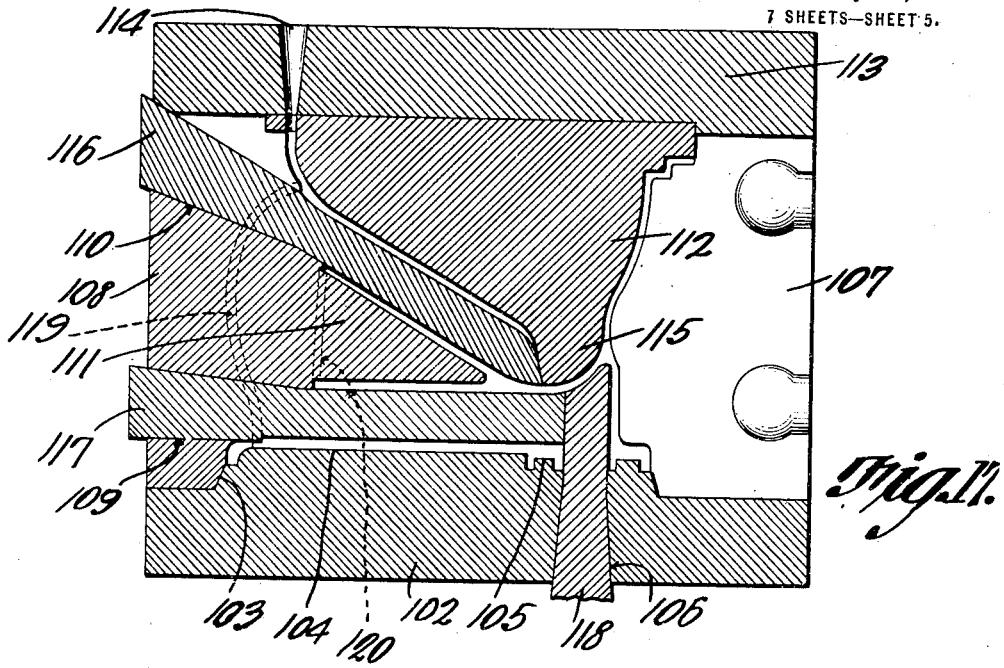
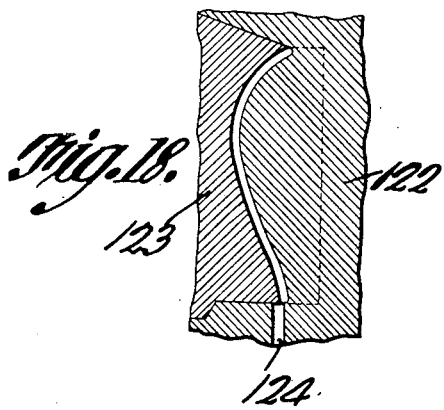
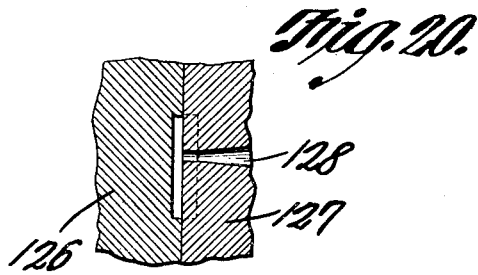
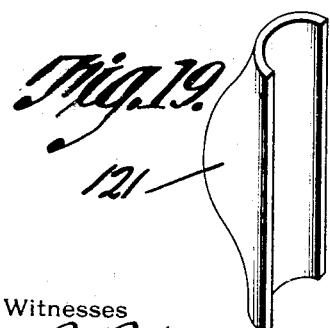
Witnesses
S. C. Hill
Inventor
by C. A. Snow & Co.
Attorneys

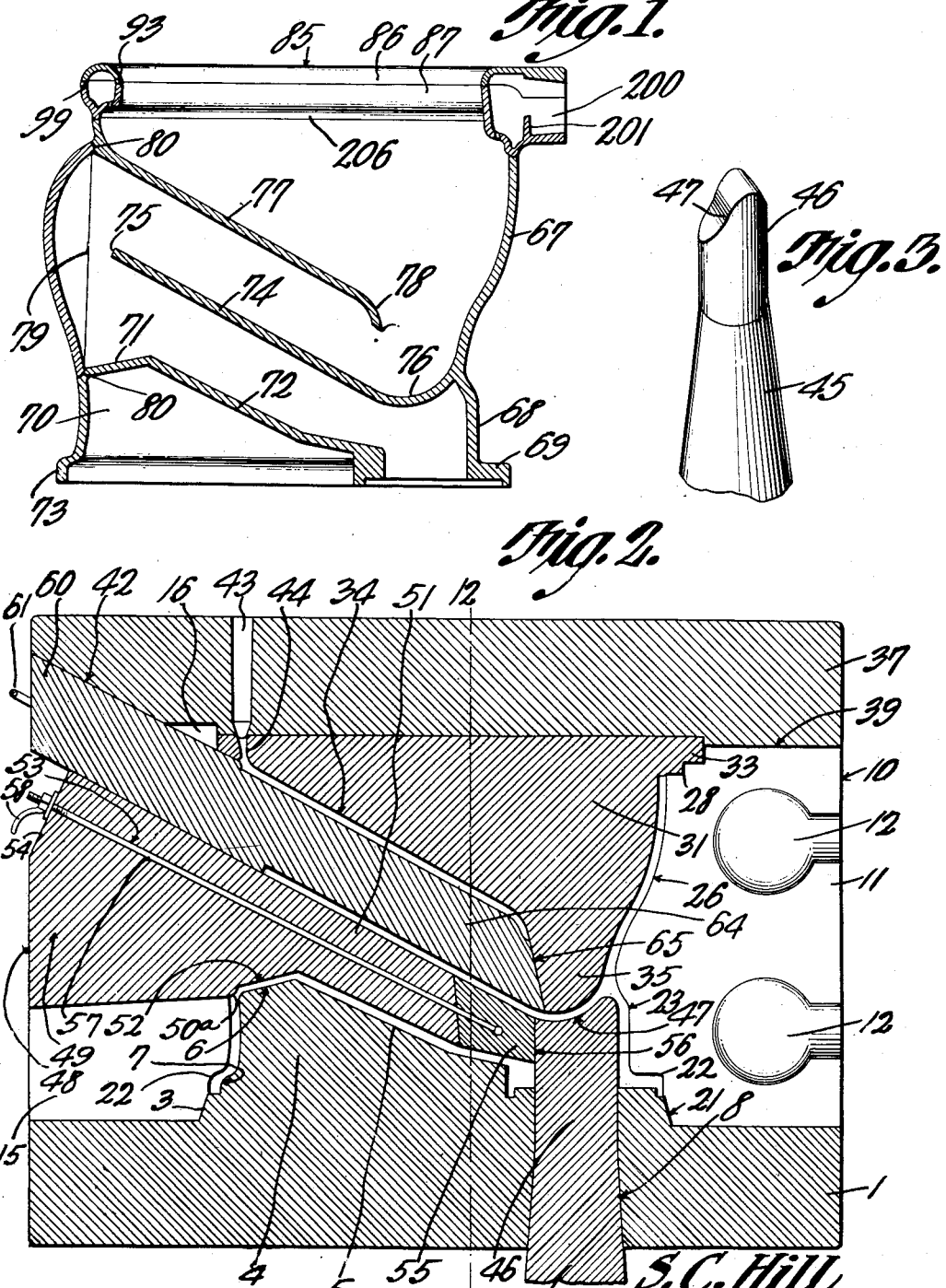

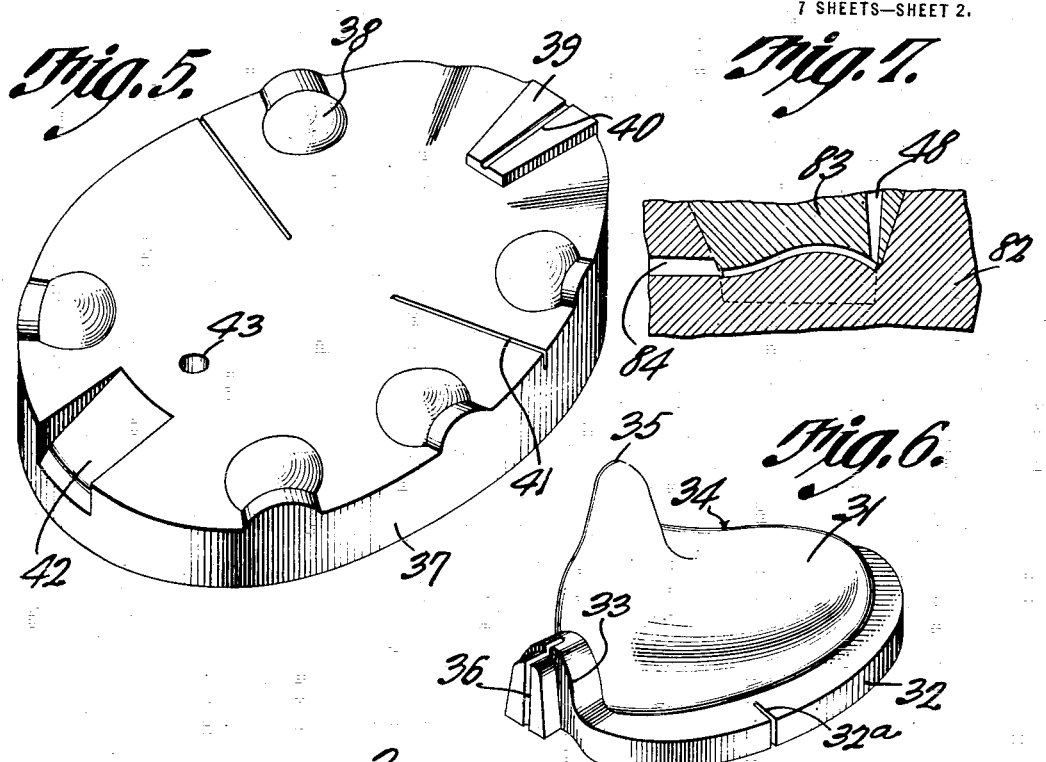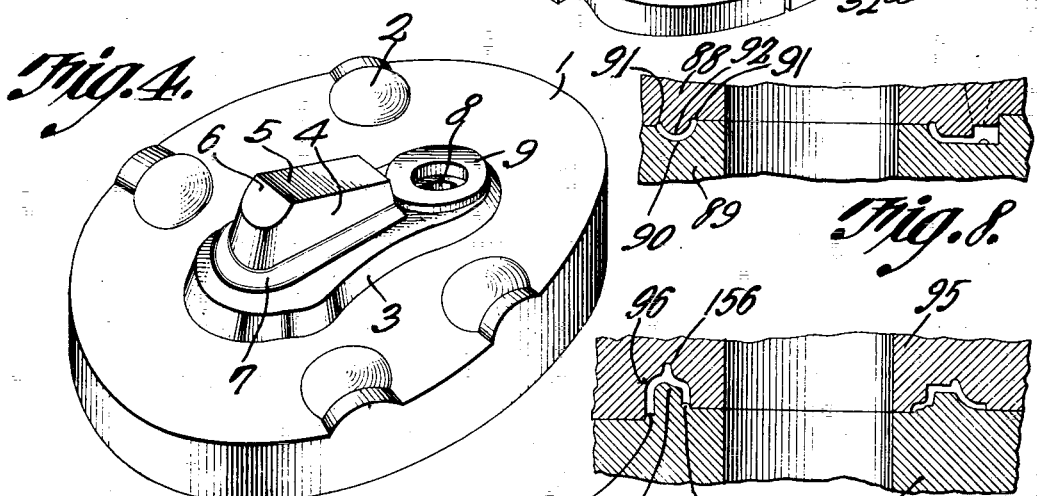

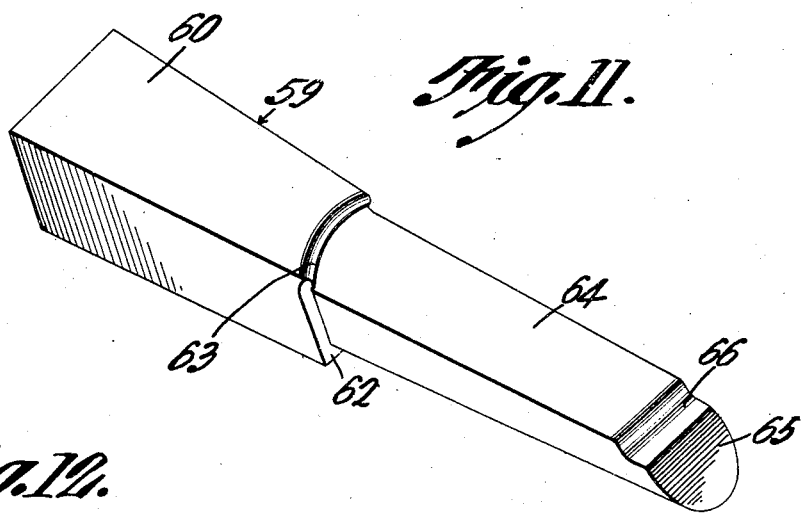
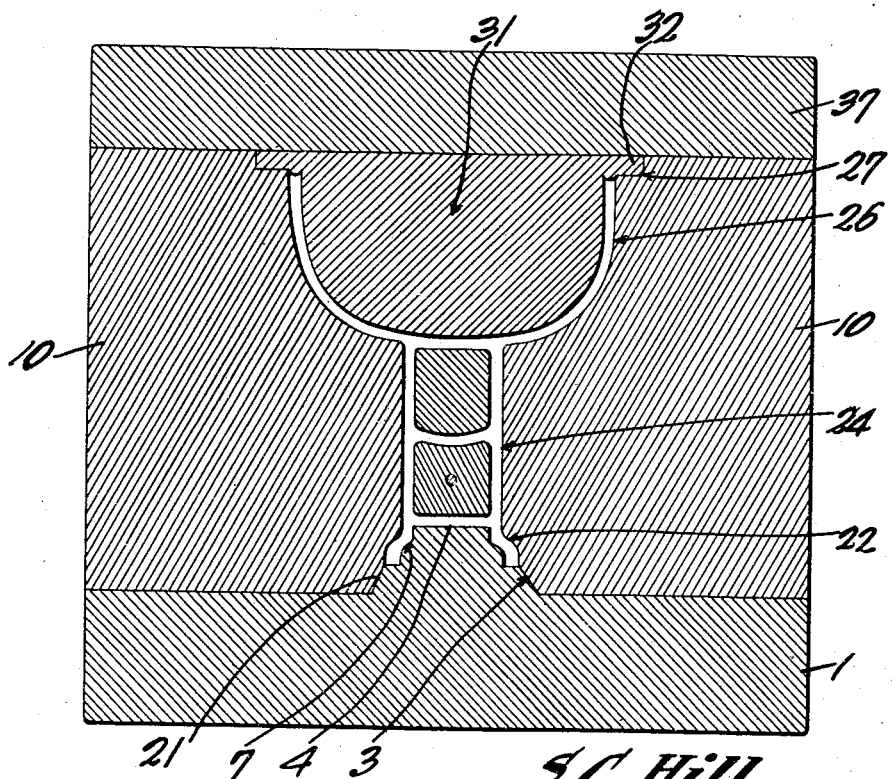

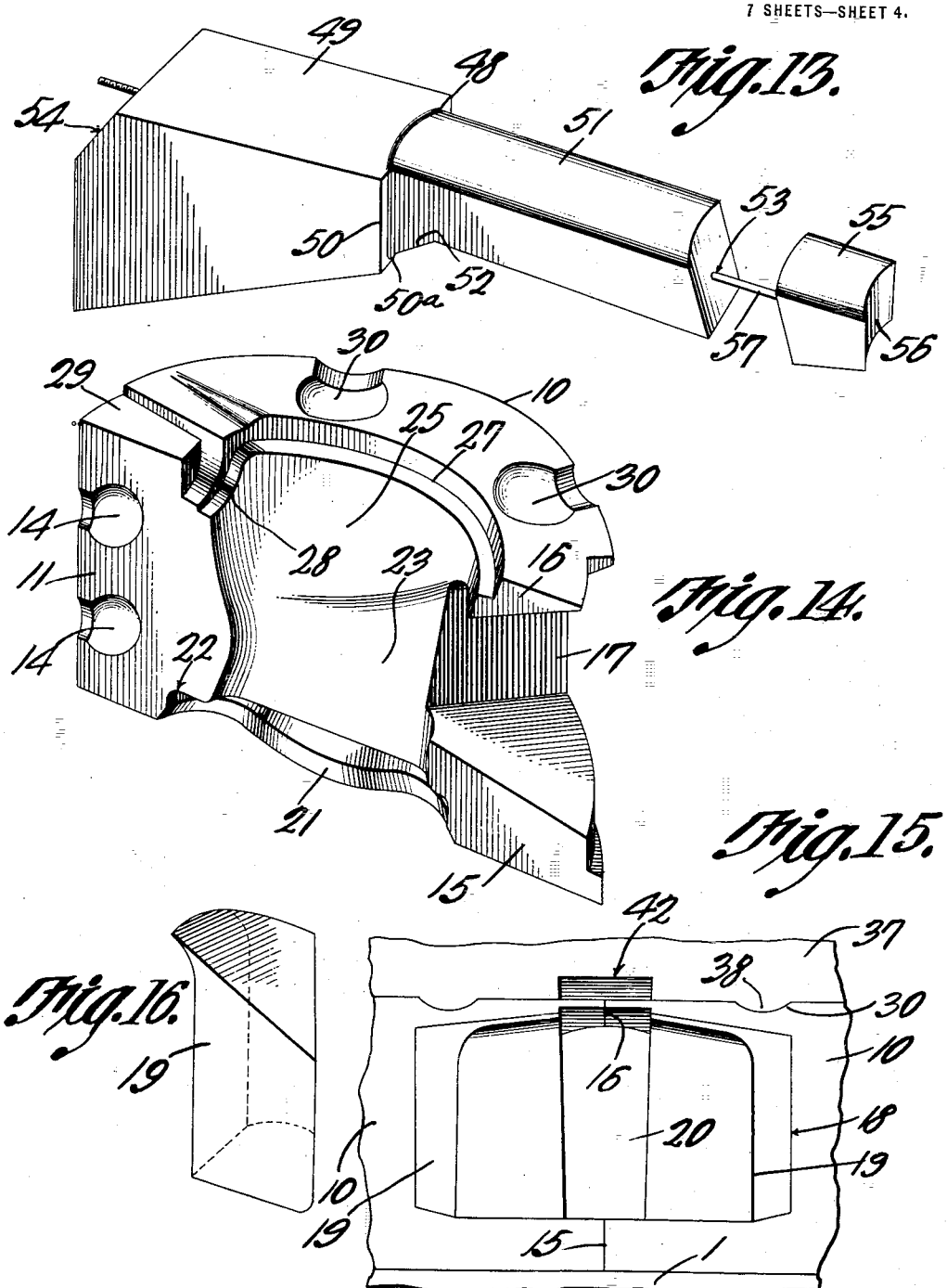

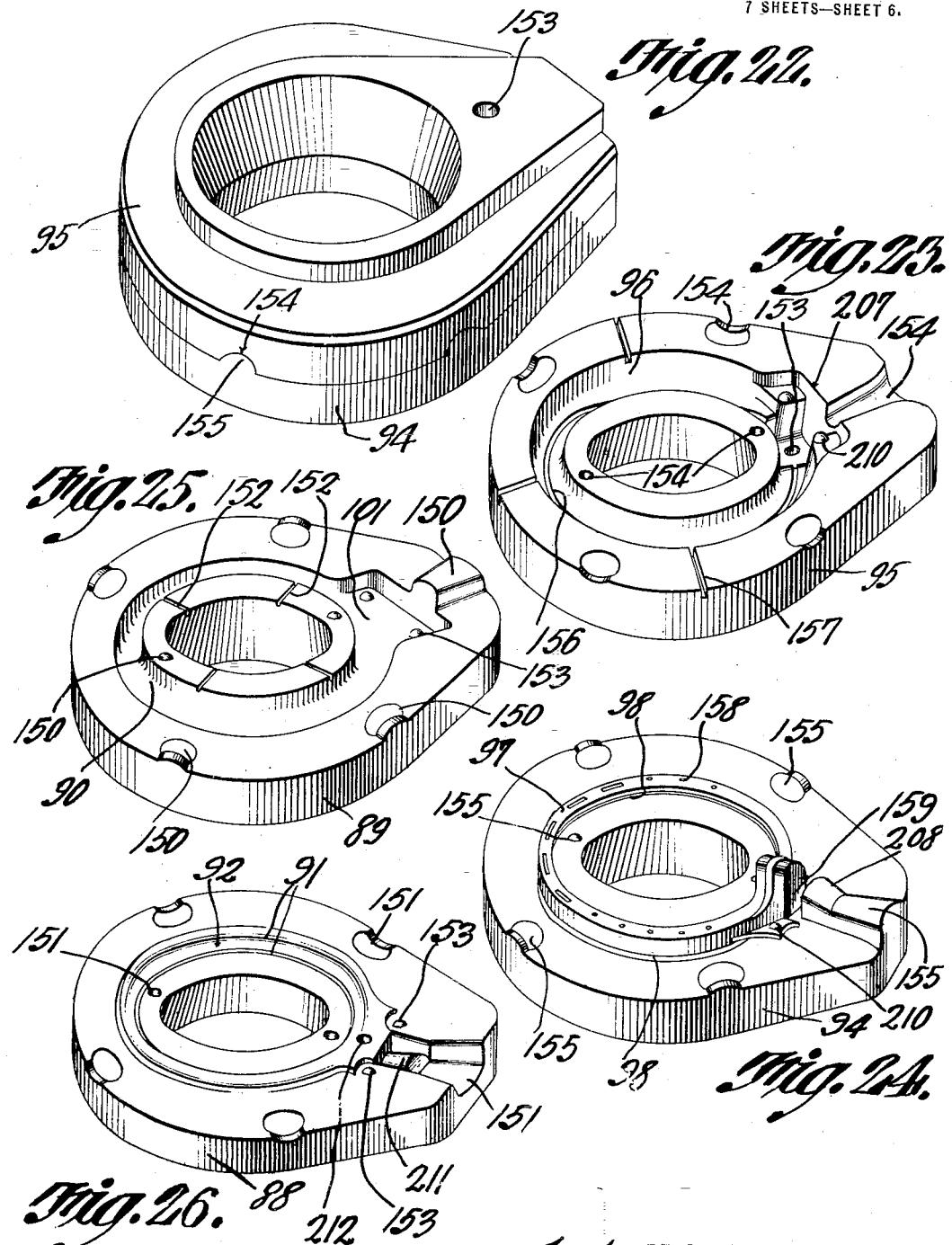

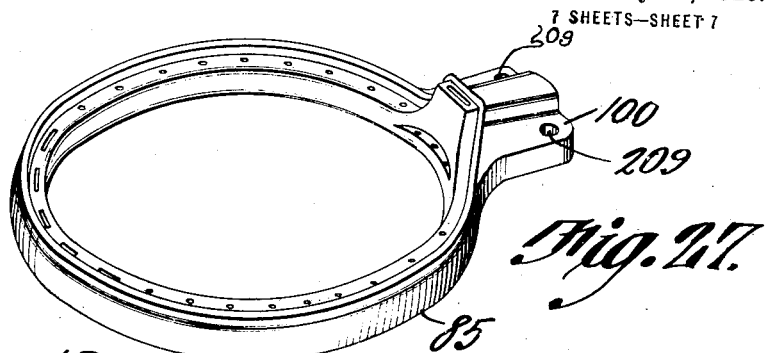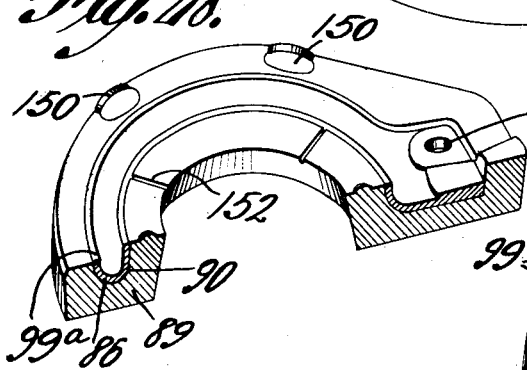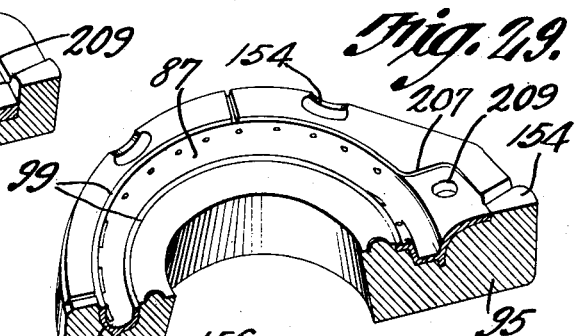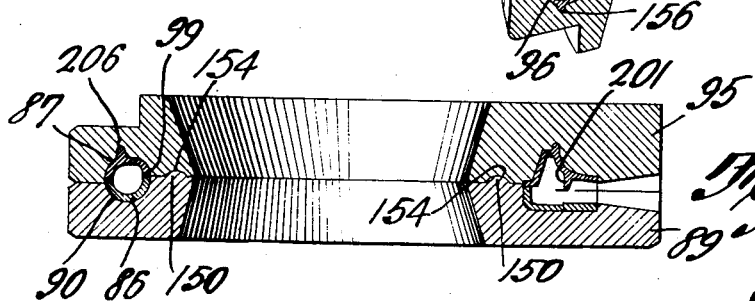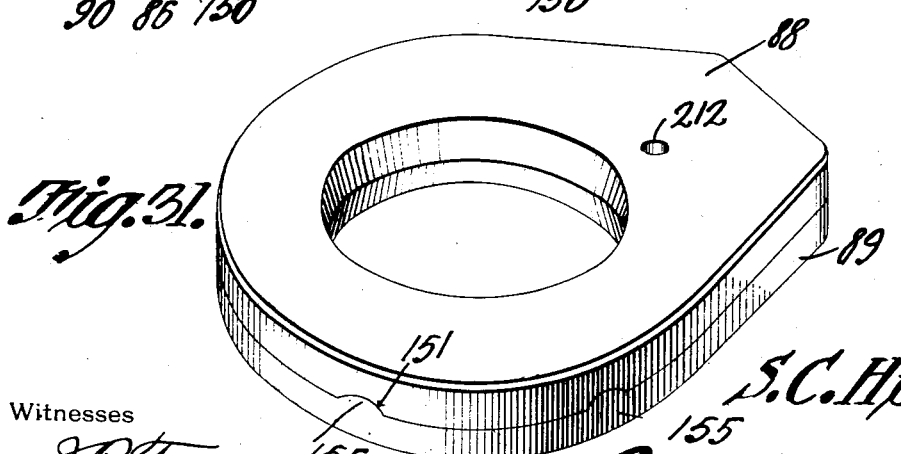

UNITED STATES PATENT OFFICE.

SAMUEL C. HILL, OF WHEELING, WEST VIRGINIA.

MOLD.

1,183,067.  Specification of Letters Patent.  Patented May 16, 1916.

Application filed March 7, 1914. Serial No. 823,161.

*To all whom it may concern:*

Be it known that I, SAMUEL C. HILL, a citizen of the United States, residing at Wheeling, in the county of Ohio and State of West Virginia, have invented a new and useful Mold, of which the following is a specification.

One object of the present invention is to provide a mold whereby an article of the class above mentioned may be fashioned complete, without the intervention of an interval of time between the formation of the parts.

Another object of the invention is to provide a mold whereby an article of the sort herein disclosed may be made without tapping out surplus slip.

The invention aims to improve latrine molding structures generally, and, specifically, to provide a structure of the class above mentioned in which a plurality of formers coöperate in a novel manner with each other, with the bowl core and with the outlet forming plug.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings: Figure 1 shows in vertical transverse section, one form of product fashioned in the apparatus herein disclosed. Fig. 2 is a vertical transverse section of the molding apparatus as the same will appear when set up for use; Fig. 3 is a perspective view showing the outlet forming plug; Fig. 4 is a perspective view showing the base of the mold; Fig. 5 is a perspective view showing the lid or top of the mold; Fig. 6 is a perspective view of the bowl core; Fig. 7 is a sectional detail showing the molding structure in which the bowl closure is formed; Fig. 8 is a sectional detail showing the mold members in which one section of the bowl rim is formed; Fig. 9 is a sectional detail showing coöperating mold members in which the other part of the rim of the mold is formed; Fig. 10 is a detail view showing the closure member which is fashioned in the mold depicted in Fig. 7; Fig. 11 is a perspective detail showing the secondary former; Fig. 12 is a cross section on the line 12—12 of Fig. 2; Fig. 13 is a perspective detail illustrating the primary former; Fig. 14 is a perspective view showing one of the casing sections; Fig. 15 is an end view of the main mold, parts being omitted; Fig. 16 is a perspective of one of the wedge blocks shown in place in Fig. 15; Fig. 17 is a vertical longitudinal section, similar to Fig. 2 but depicting a modification; Fig. 18 is a sectional detail illustrating a pair of coöperating mold members in which a closure employed in connection with Fig. 17 is made; Fig. 19 is a perspective view showing the closure which is fashioned in the mold sections set forth in Fig. 18; Fig. 20 is a sectional detail illustrating a pair of coöperating mold members in which another closure is formed; Fig. 21 is a perspective showing the closure which is constructed by the mold sections in Fig. 20; Fig. 22 is a perspective illustrating the mold in which the lower member of the flushing rim is formed; Fig. 23 is a perspective illustrating the top element of the mold in which the lower member of the flushing ring is formed; Fig. 24 is a perspective illustrating the bottom element of the mold in which the lower portion of the rim is made; Fig. 25 is a perspective illustrating the bottom element of the mold in which the upper portion of the rim is formed; Fig. 26 is a perspective illustrating the top element of the mold in which the upper portion of the rim is formed; Fig. 27 is a perspective illustrating the completed flushing rim; Fig. 28 is a sectional perspective illustrating a portion of the bottom element of the mold in which the upper portion of the rim is made; Fig. 29 is a sectional perspective illustrating the top element of the mold in which the lower portion of the flushing rim is made; Fig. 30 is a transverse section showing the parts depicted in Figs. 28 and 29 placed together to complete the flushing rim shown in Fig. 27; Fig. 31 is a perspective view illustrating the elements shown in Figs. 25 and 26 placed together.

In carrying out the present process, and referring particularly to Figs. 1 to 16 both inclusive, there is provided a base 1 which is shown in detail in Fig. 4, the base being provided upon its upper surface with locking lug 2. The base 1 supports an integral table 3 upon which is fashioned a pedestal 4 having oppositely inclined upper faces 5 and 6, the face 5 being longer than the face 6. Surrounding the pedestal 4 at the base thereof is a rib 7. A hole 8 extends through the base 1 and through the table 3 and around the hole is formed an annular rib or ring 9.

The invention includes a pair of casing sections, denoted generally by the numeral 10, one casing section being shown in detail in Fig. 14 and the casing sections being substantially alike. The casing sections 10 at one end are provided with abutting faces 11. The face 11 of one casing section is provided with locking lugs 12 received in correspondingly shaped recesses 14 in the face 11 of the other section. The casing sections 10 at their opposite ends are provided with abutting lower faces 15 and abutting upper faces 16. Between the abutting lower and upper portions of the sections the same are cut away as shown at 17, so that in one end of the casing, when the casing sections are fitted together, there is formed a recess 18 which will be understood best from Fig. 15. Into the side portions of the recess 18 are inserted wedge-shaped blocks 19, one of which appears in Fig. 16. The adjacent faces of these blocks 19 are spaced apart so as to define an inwardly extended passage 20. At their lower ends, the casing sections 10 are shaped as shown at 21 so as to receive the table 3 of the base 1, reference being had particularly to Fig. 12. Above the portions 21, the casing sections 10 are cut away as shown at 22 so that a space exists around and above the rib 7 when the casing sections 10 are supported upon the base 1. In their inner faces, the casing sections 10 are provided with channels 23 which define a reduced throat 24 shown in Fig. 12. Above the channels 23, the casing sections 10 are laterally enlarged as shown at 25 in Fig. 14 to define a basin 26 (Fig. 12). Around the upper edges of the laterally enlarged portions 25 are formed grooves 27 having communicating notches 28 therein, the casing sections being provided upon their upper faces with superficial recesses 29 which communicate with the notches 28. Depressions 30 are formed in the upper faces of the casing sections 10, and at this point it will be understood that in the lower faces of the casing sections, similar depressions are formed, which last named depressions receive the locking lugs 2 on the base 1.

The invention further includes a bowl core 31 shown in detail in Fig. 6. The bowl core 31 is provided with a flange 32. The bowl core projects downwardly into the basin 26 and the flange 32 fits in the groove 27. The bowl core 31 is provided with a lug 33 which fits into the notches 28. The lower face of the bowl core 31 is inclined as shown at 34 and the core terminates in a downwardly extended nose 35 which is disposed above the hole 8 in the base 1. The flange 32 may be grooved as indicated at 32ª. The lug 33 may be grooved or slit as shown at 36.

The invention includes a lid or cover 37 shown in detail in Fig. 5. The lid 37 is equipped with lugs 38 which register in the depressions 30 of the casing sections 10. Upon the lower face of the lid 37 is formed a tongue 39 which fits into the superficial recesses 29 of the casing sections 10. The under face of the lid 37 may be grooved radially as shown at 41, and a groove 40 may be formed in the tongue 39. In that end of the lid 37 which is opposite to the tongue 39 is formed an inclined slot 42 which lines up vertically with the opening 20 depicted in Fig. 15. The lid 37 rests on the casing sections 10 and on the bowl core 31. It is entirely obvious without specific illustration, that if desired, the bowl core 31 and the lid 37 may be made in one piece. The lid 37 is provided with a pouring hole 43 alined with a pouring hole 44 in the bowl core 31, these details being shown most clearly in Fig. 2.

An outlet forming plug 45 constitutes a part of the invention, this element being delineated in detail in Fig. 3 and being shown in place in Fig. 2. The plug 45 at its lower end is tapered, but its upper end may be of cylindrical form as shown at 46. The upper end of the portion 46 of the plug 45 is beveled or concaved as shown at 47. The plug 45 is mounted in the opening 8 in the base 1 and the beveled or concaved end 47 of the plug lies above the ring 9.

The invention further includes a primary former 48 shown in detail in Fig. 13. The former 48 includes a head 49, the inner end wall of which is shown at 50. Projecting inwardly from this end of the head of the former is an arm 51, inclined along its lower edge and adjacent the end wall 50 of the head 49, as shown at 52. The former 48 is provided with a bore 53 and the outer end face of the head 49 of the former is inclined as shown at 54 so as to stand at right angles to the axis of the bore 53. The primary former 48 includes a tip 55, concaved as shown at 56 upon one end. A rod 57 is anchored at one end in the tip 55 of the former, the rod 57 being received slidably in the bore 53. Threaded onto the outer end of the rod 57 is a lever nut 58 or its equivalent, adapted to bear against the inclined end face 54 of the former. The primary former 48 is inserted into the opening 20, the concaved end face 56 of the tip 55 receiving the plug 45. A secondary former 59 is provided, the same being shown in detail in Fig. 11. The former 59 includes a head 60 to the outer end of which a handle 61 is secured as shown in Fig. 2. The inner end wall of the head 60 is shown at 62 and may be provided with an inwardly projecting rib 63. Projecting from the inner end of the head 60 of the secondary former 59 is an arm 64 having an inclined end face 65 above which is located a notch 66. The secondary former 59 is inserted into the upper portion of the opening 20 above the primary former 48, the head 60 of the secondary former being received in the notch 42 of the lid 37. The parts now appear as shown in Fig. 2 and when the slip is poured in through the holes 43 and 44, there will be fashioned a product of the type illustrated in Fig. 1, saving for the fact that the upper ring of the article has not yet been completed nor part 81 attached.

The completed latrine or closet shown in Fig. 1 may be described briefly as comprising a bowl 67 provided with a tubular outlet 68 having a flange 69, the lower portion of the bowl 67 being connected with an apron 70 having a flange 73. Located within the contour of the apron is an inclined water table 71 connected with an oppositely inclined partition 72. Located above the partition 72 is a tongue 74, one end of which is denoted by the numeral 75. The other end of the tongue 74 is depressed as indicated at 76 and merges into the bowl 67. Located above the tongue 74 is a spoon 77, the outer edge of which merges into the bowl, the inner end of which is downwardly inclined as indicated at 78, the end 78 being disposed above the depressed end 76 of the tongue 74.

When the slip is poured into the mold shown in Fig. 2, the structure above described will be produced and to avoid a lengthy description, a table is inserted hereinafter, in one column of which are placed the parts of the latrine, and in the other column of which are placed the corresponding parts of the mold. A reference to this table and an examination of Fig. 2 will explain thoroughly the functions of the parts of the mold in the making of the finished product.

Referring to Fig. 1 and noting the foregoing description, it will be observed that an opening 79 remains in the front wall of the bowl 67 of the latrine, this opening being grooved as shown at 80.

| Part of product. | Part of the mold. |
| --- | --- |
| 67 | 31—26 |
| 68 | 46—24 |
| 69 | 9—22 |
| 70 | 4—24 |
| 71 | 6—52 |
| 72 | 5—51 |
| 73 | 7—22 |
| 74 | 51—64 |
| 75 | 50 |
| 76 | 35—47 |
| 77 | 64—34 |
| 78 | 66—35 |
| 79 | 49—60 |
| 80 | 63—50a |

A closure for the opening 79 is provided, this closure being denoted by the numeral 81 and being shown in detail in Fig. 10. The closure 81 is fashioned in a pair of cooperating mold members 82 and 83, depicted in Fig. 7, one of these mold members being provided with a pouring hole 84. After the closure 81 has been formed in the manner above described, the closure is mounted in the grooves 80 of the opening 79 in the bowl of the product.

The flushing rim 85 is shown in Fig. 27, and in this connection Fig. 27 may be compared with Fig. 1. The rim 85 comprises an upper member 86 and a lower member 87, the hinge lug being indicated at 100, and the inlet being shown at 200, there being a lip 201 projecting into the inlet. Upon the lower member 87 of the rim there is formed a tongue 206, shown clearly in Fig. 30, the tongue being adapted to be united to the rim of the bowl. In the hinge lug 100 holes 209 are formed.

In connection with the mold in which the lower member 87 of the rim is formed, attention is directed to Figs. 9, 22, 23 and 24. The mold in question comprises a top section 95 and a bottom section 94. There are recesses 154 in the top section 95 which cooperate with lugs 155 on the bottom section 94, to prevent the sections from slipping laterally on each other. In the top section 95 there is formed, as shown in Fig. 23, a groove 96 at the base of which there is a slot 156. On the bottom section 94 there is a rib 97 which is received in the groove 96, the rib 97 being provided with indentations or marks of some sort, indicated at 158 and adapted to show where the outlet perforations are to be pierced in the finished product. Upon each side of the rim 97 there are smaller ribs 98. There is a pouring hole 153 in the part 95 and air escapes through vent slits 157. The hinge lug 100 is formed partly in a recess 207 formed in the upper member 95 and the inlet opening 200 is shaped by an inwardly flaring lug 208 on the part 94. There is a slot 159 adjacent the lug 208 which forms the lip 201. The holes 209 in the hinge lug 100 are formed by cooperating bosses 210.

The parts 94 and 95 of the mold in which the lower member 87 is formed are disposed as shown in Fig. 22 and the slip is poured in through the hole 153. The lower member 87 of the flushing rim is thus formed, as indicated in Fig. 29, the slot 156 forming the tongue 206. The upper member 86 of the flushing rim is formed in a mold shown in Fig. 31 and comprising a top member 88, shown in Fig. 26 and a bottom member 89 shown in Fig. 25. The bottom member 89 is provided with a groove 90 and has air slits 152. This element of the mold is provided with bosses 150. The hinged lug recess is shown at 101. The top member 88 of the mold shown in Fig. 26 is provided with recesses 151 which receive bosses 150. The top member 88 includes a rib 92, received in the groove 90, reference being had to Fig. 8. Upon each side of the rib 92, recesses 91 are formed. The top member includes a tapered lug 211 which aids in forming the inlet 200. Coöperating bosses 153 on the members 88 and 89 serve to aid in forming the holes 209 in the hinge lug. The parts 88 and 89 are superposed upon each other as shown in Fig. 31 and the slip is poured into the mold through the pouring hole 212. By this operation, the upper member of the mold will be formed, substantially as shown in Fig. 8. The ribs 98 form grooves 99 in the edges of the lower member 87 of the rim and the recesses 91 form ribs 99ª on the upper member 86 of the rim. The top section 95 is then placed on the bottom section 89, as shown in Fig. 30, the grooves 99 receiving the ribs 99ª on the finished product. Thus, the constituent members 86 and 87 of the rim are brought together, and, after a sufficient period of time has elapsed, the members 95 and 89 shown in Fig. 30 may be separated, whereupon the complete flushing rim 85 is placed upon the bowl of the mold, the tongue 206 on the flushing rim coöperating and coalescing with the bowl of the mold.

In Figs. 17 to 21 inclusive, a modified form of mold is shown. This mold resembles in most particulars, the structure hereinbefore described, and the description of that form of the invention under consideration may be shortened accordingly. Referring to Fig. 17, the base is indicated at 102 and the table at 103, the rib being shown at 104, the same corresponding to the pedestal 4. The ring 105 corresponds to the ring 9. In the base 102 an opening 106 is formed. The casing sections are shown at 107. A single wedge block 108 replaces the wedge blocks 19 before described. In the wedge block 108 there is a hole 109 and in the upper edge of the wedge block an inclined groove 110 is formed. The wedge block is provided with a tapered or pointed extension 111. The bowl core is shown at 112 and the lid at 113, the same having pouring holes 114. The nose of the bowl core is shown at 115. The secondary former is designated by the reference character 116 and is engaged slidably in the groove 110 of the block 108. The primary former 117 is inserted through the hole 109 in the block. The outlet forming plug appears at 118. The product produced in the mold under discussion differs from the product shown in Fig. 1, in that the product produced in the mold shown in Fig. 17 is provided with a central core which, when the pouring operation has been completed, is open at one end as indicated at 120. The opening in the wall of the bowl hereinbefore described, is shown at 119. In this form of the invention, two closures therefore instead of one are required. The closure for the opening 119 is shown in detail in Fig. 19 and is indicated by the reference character 121, this closure being fashioned in a pair of coöperating mold members 122 and 123 shown in Fig. 18, one of which mold members is provided with a pouring hole 124. The closure for the opening 120 is indicated by the reference character 125 and is shown in Fig. 21. The closure 125 is made in a mold comprising coöperating members 126 and 127, one of which has a pouring hole 128. The closure 125 is first mounted in place in the opening 120 and then the closure 121 is mounted in the opening 119.

In practical operation, the parts are positioned as shown in Fig. 2 and the slip is poured into the mold through the opening 43—44. In one method of procedure, after the slip has set sufficiently, the entire mold is inverted, so that the same rests upon the lid 37. Then the secondary former 59 is removed by means of the handle 61. The lever nut 58 is removed from the rod 57. The body portion of the primary former 48 is slid off the rod and subsequently the rod together with the tip 55 is removed. The plug 45 may be detached from the part 1 and the same may be lifted off the product, the casing sections 10, the member 37 and the bowl core 31 subsequently being removed.

Obviously, the foregoing steps may be varied but, generally considered, it is desirable that, whatever course of procedure be followed, the secondary former 59 be removed before the primary former 48 and its tip 55 are taken out.

It is to be observed that the faces of the coöperating parts of the structure, as shown in Fig. 2, are spaced apart by a distance equal to the thickness of the finished product. There is no occasion, therefore, for tapping to let the slip out of internal chambers or pockets. Further, the entire process may be carried out at once, and there is no occasion for permitting an extended period of time to elapse between the formation of one part of the product and the formation of another part thereof.

As is well understood in the art, the parts of the mold are ordinarily made of plaster of Paris or some similar substance which will take the moisture out of the slip with sufficient rapidity. As will be appreciated by those skilled in the art, the slits 41, 36 and 32ª constitute air vents.

Especial attention is directed to the fact that the part 49—51 of the former 48 may be slipped off the rod 57. Then the rod 57 may be given a slight lateral movement which serves to loosen the hold of the tip 55 on the material and to render easy a removal of the tip, the tip not infrequently tending to adhere more closely to the material than does the part 49—51 of the former.

Having thus described the invention, what is claimed is:—

1. A mold of the class described comprising coöperating bowl forming elements and coöperating siphon passage forming elements, the respective coöperating elements being spaced from each other by a distance representing the thickness of the wall of the bowl and siphon passage of the finished product; and means for admitting slip between the coöperating elements.

2. A mold of the class described comprising a casing having an opening in its side wall, and comprising coöperating parts; and a removable passage former slidably insertible and removable with respect to the casing through the opening in the side wall while the said parts of the casing are in coöperating relation.

3. A mold of the class described comprising a casing having an opening in its side wall, and comprising coöperating parts; and a pair of superposed passage formers slidably insertible and removable with respect to the casing through the opening in the side wall while the said parts of the casing are in coöperating relation.

4. A mold of the class described comprising a base; a casing resting thereon; an outlet forming plug inserted into the base; and a passage former removably inserted through the side wall of the casing and coöperating with the plug.

5. A mold of the class described comprising a casing; a bowl core therein; and a laterally extended removable passage former projecting through the outer wall of the casing and coöperating terminally with the bowl core.

6. In a device of the class described, a mold comprising a base; a casing resting thereon; a bowl core within the casing; an outlet forming plug inserted through the base and coöperating with the bowl core; and a former removably mounted in the casing and coöperating with the plug.

7. In a mold of the class described, a base, a casing supported thereby; a bowl core within the casing; an outlet forming plug inserted through the base and coöperating with the bowl core; and a laterally removable former carried by the casing and coöperating with the bowl core.

8. In a device of the class described, a base; a casing resting thereon; a bowl core within the casing; an outlet forming plug insertible through the base; and a pair of laterally removable formers carried by the casing, one former coöperating with the bowl core and the other former coöperating with the plug.

9. A mold of the class described comprising a casing and a passage former inserted through the side wall of the casing, the passage former being provided with a removable tip.

10. A mold of the class described comprising a casing; and a passage former inserted through the side wall of the casing, the passage former including a body portion and a removable tip, the tip having a rod passing through the body portion of the former, the body portion of the former being removable, along the rod, independently of the tip.

11. In a device for forming the coacting parts of a flushing rim, a pair of molds each comprising a primary member and a secondary member coöperating with the primary member, the primary member having a groove and the secondary member having a tongue registering in the groove, one secondary member having concavities upon opposite sides of its tongue and adapted to form tongues on one part of the rim, the other secondary member having ribs upon opposite sides of its tongue and adapted to form grooves on the other part of the rim, the ribs of one secondary member being shaped to correspond to the concavities of the other secondary member, and the primary members being adapted to be placed together to cause the tongues and the grooves on the parts of the rim to coact.

In testimony that I claim the foregoing as my own, I have hereto affixed my signature in the presence of two witnesses.

SAMUEL C. HILL.

Witnesses:
 CHAS. N. METZGER,
 EDWARD J. LALLY.